(12) United States Patent
Yang et al.

(10) Patent No.: US 6,503,387 B2
(45) Date of Patent: Jan. 7, 2003

(54) METHOD AND DEVICE FOR ELECTROCHEMICAL DISCHARGE PROCESSING WITH SELF-ACTING BUBBLE LAYER

(75) Inventors: Ching-Tang Yang, TaiNan (TW); Hung-Yin Tsai, Hsinchu (TW); Tung-Chuan Wu, Hsinchu (TW)

(73) Assignee: Industrial Technology Research Institute, Hsinchu (TW)

( * ) Notice: Subject to any disclaimer, the term of this patent is extended or adjusted under 35 U.S.C. 154(b) by 69 days.

(21) Appl. No.: 09/779,529

(22) Filed: Feb. 9, 2001

(65) Prior Publication Data
US 2002/0110502 A1 Aug. 15, 2002

(51) Int. Cl.$^7$ .......................... B23H 5/00; C25D 17/00
(52) U.S. Cl. ............... 205/668; 204/224 M; 219/69.1; 219/69.17
(58) Field of Search ............... 204/224 M; 205/640, 205/668, 652; 219/69.1, 69.17

(56) References Cited

U.S. PATENT DOCUMENTS

| | | | | |
|---|---|---|---|---|
| 2,258,480 A | * | 10/1941 | Bergmann et al. | 204/164 |
| 2,300,855 A | * | 11/1942 | Allen et al. | 125/30.02 |
| 4,800,006 A | * | 1/1989 | Kuwabara et al. | 204/224 M |
| 4,847,463 A | * | 7/1989 | Levy et al. | 219/121.19 |
| 4,861,450 A | * | 8/1989 | Asaoka et al. | 204/224 M |
| 5,217,586 A | * | 6/1993 | Datta et al. | 204/224 M |
| 5,993,637 A | * | 11/1999 | Hisamatsu et al. | 204/224 M |

* cited by examiner

Primary Examiner—Nam Nguyen
Assistant Examiner—Thomas H. Parsons
(74) Attorney, Agent, or Firm—Troxell Law Office PLLC

(57) ABSTRACT

The present invention relates to an electrochemical discharge method and device with self-acting bubble layers, wherein the device comprises an electrode, being the cathode, capable of supplying self-acting bubble layers, an auxiliary electrode, being the anode, an conducting fluid, and an non-conductive work piece for processing. Processing, and precision processing in particular, of non-conductive materials is obtained by arc discharge caused by high voltage application and chemical reactions associated with cathode and anode.

9 Claims, 6 Drawing Sheets fine drill processing of gemstones (φ200μm)

(agate, Burmese jade, ruby, and artificial diamonds)

drill of glasses (φ250μm)

(laser machining)  (simultaneous arc and etching)

METHOD AND DEVICE FOR ELECTRO-CHEMICAL DISCHARGE PROCESSING WITH SELF-ACTING BUBBLE LAYER

FIELD OF THE INVENTION

The present invention relates to an electro-chemical discharge method and device with self-acting bubble layers and in particular relates to an arc processing method and device capable of speed-processing non-conductive materials.

BACKGROUND OF THE INVENTION

Conventional arc processing is achieved by using a control circuit for a discharge process in which a current source is connected across the electrode and the work piece for generating an arc discharge, said circuit producing pulses for the ignition and stabilization of the arc. Being limited to heating, melting or fusion, the prior art processes do not involve chemical etching. It normally involves slower processes, with such disadvantages that the processes usually leave behind a rough surface on the work piece. Moreover, work piece has to be electrically conductive in order to be arc processed as described above. Consequently, such conventional arc processing or carving processing cannot be extended to non-conductive materials.

Another disadvantage of conventional arc processing lies in its inability to elevate processing rate due to limitations associated with electrolysis.

In light of the foregoing, the present invention is aimed to provide solutions to the aforementioned discrepancies so as to attain enhanced processing with extended applications.

SUMMARY OF THE INVENTION

An object of the present invention is to provide a method and device for processing non-conductive materials. Bubbles are first created by electrolysis to form insulating bubble layers. By continuous application of high voltage across the electrodes to cause ionic breakdown of air molecules in the bubble layers, the present invention is capable of generating arc discharge, thereby enabling fusion evaporation and chemical etching for processing non-conductive materials.

Another object of the present invention is to improve arc-processing efficiency. Simultaneous action of arc processing and chemical etching elevates processing rates while achieving surface smoothness on the work piece.

The third object of the present invention is to reduce the operation cost by applying low cost arc processing on high precision and non-conductive parts. The demand for low cost processing remains high and the present invention provides solutions in terms of method and device.

The fourth object of the present invention is to elevate the processing rate. By actively supplying air bubbles to facilitate the formation of bubble layers, the present invention is capable of quickly providing the condition necessary for generating arc discharge, thereby elevating the processing rate.

The following Description and Designation of Drawings are provided in order to help understand the features and content of the present invention.

BRIEF DESCRIPTION OF THE DRAWINGS

The accompanying drawings form a material part of this description, in which.

DETAILED DESCRIPTION OF THE PREFERRED EMBODIMENT

Figure 1:
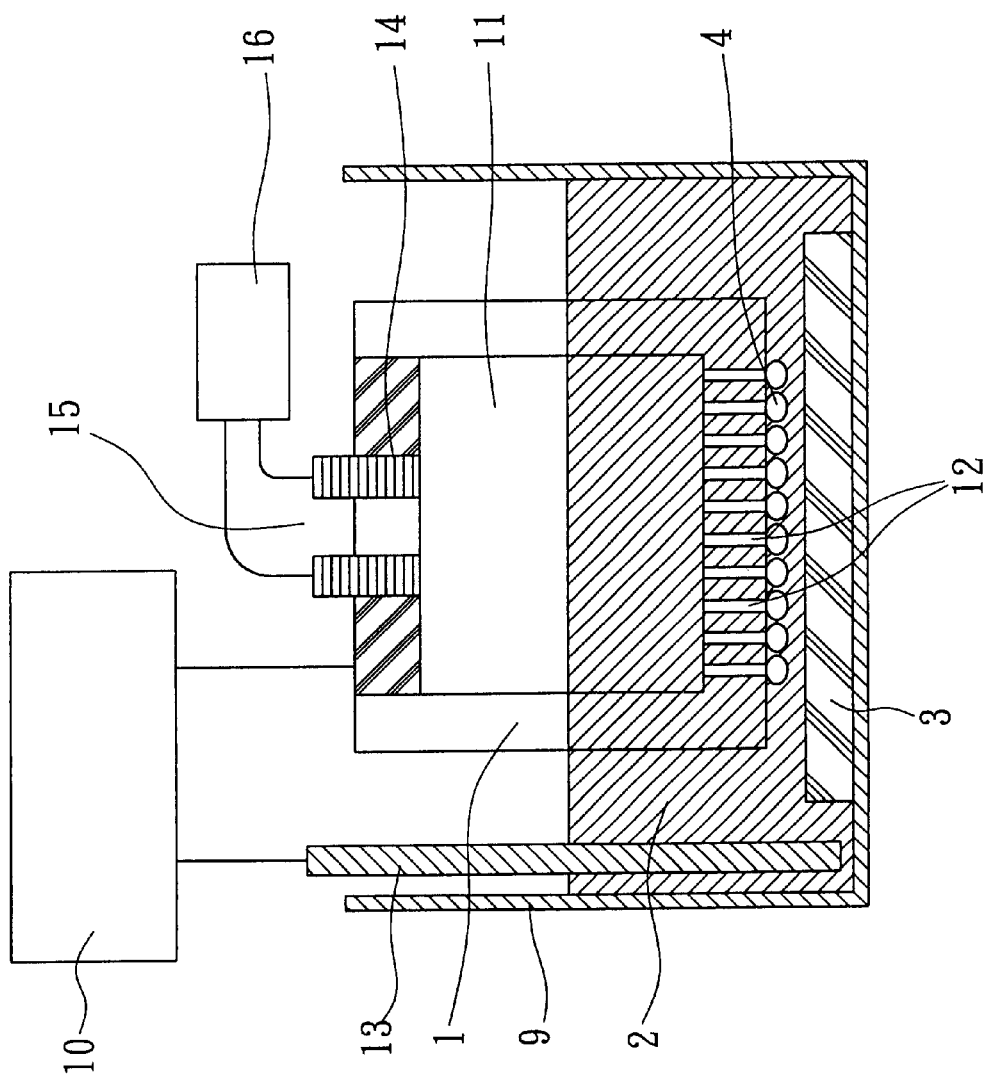
FIG. 1 is a perspective view of an electrochemical discharge device with self-acting bubble layers in accordance with the first embodiment of the present invention.
Figure 2A:
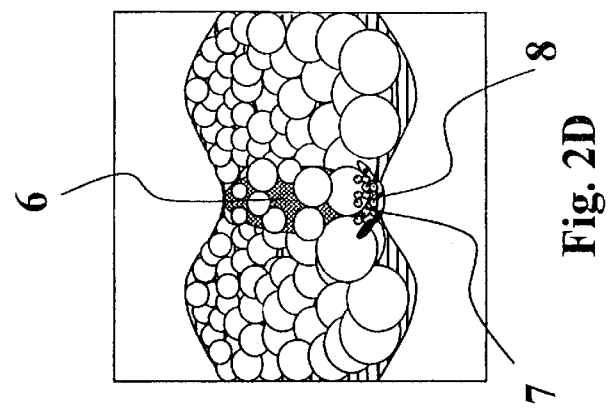
FIG. 2A is a perspective view showing the condition prior to generation of air bubbles.

Specific steps of the present invention are illustrated in the following paragraphs. Placed in a conducting fluid 2 and a proper distance away from a non-conductive work piece 3, a self-acting electrode 1 connected with air chamber 11 points its arc path toward said non-conductive work piece 3. Air dispenser 15 is connected with exhaust opening 14 on one end and air source 16 on the other. Through micro-pipes 12 located on the bottom of self-acting electrode, air is delivered to the conducting fluid 2. An external power supply 10 is connected to self-acting electrode 1 and auxiliary electrode 13, both dipped in conducting fluid 2. The relationship between self-acting electrode 1, non-conductive work piece 3 and conducting fluid 2 are clearly shown in FIG. 2A. Both modes of generating bubbles are shown in FIG. 1. In the first paragraph, air coming from air source 16 is passed through air dispenser, air chamber 11 and micro-pipes 12 before being delivered to the bottom of self-acting electrode 1. In the second approach, voltage is applied to self-acting electrode 1 to cause an electrolysis. Specifically, cathode half-reaction and anode half-reaction occur simultaneously at self-acting electrode 1 and auxiliary electrode 13, respectively

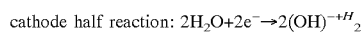
cathode half reaction: $2H_2O + 2e^- \rightarrow 2(OH)^- + H_2$

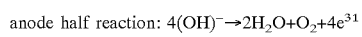
anode half reaction: $4(OH)^- \rightarrow 2H_2O + O_2 + 4e^{31}$

Figure 2B:
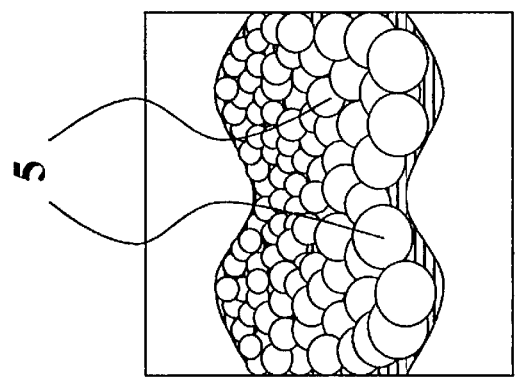
FIG. 2B is a perspective view demonstrating the generation of air bubbles.
Figure 2C:
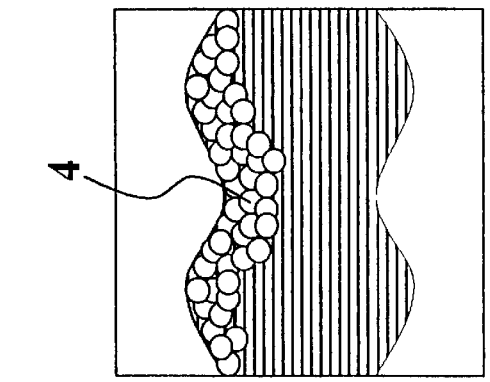
FIG. 2C is a perspective view illustrating the formation of air bubble layers.
Figure 2D:
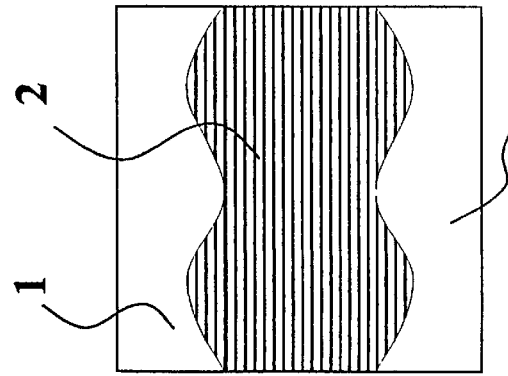
FIG. 2D is a perspective view showing the formation of arc.

Next, electrolysis introduces bubbles 4, as shown in FIG. 2B, which then forms bubble layers 5, as shown in FIG. 2C. Being a non-conductive region, bubble layers 5 are formed in conducting fluid 2 in the area between conductive electrode 1 and non-conductive work piece 3. Continuous application of high voltage causes ionic breakdown in bubble molecules and capacitive collapse in bubble layers, generating arc discharge between high voltage source and low voltage source. With continuous application of high voltage on its top part, arc 6 as shown in FIG. 2D is developed as a direct result of ionic breakdown and breakthrough in otherwise insulating bubble layers via application of super-saturated voltage. Moreover, heat generated by discharge in the vicinity of lower part of arc 6 causes local temperature to rise rapidly so as to facilitate fusion evaporation 7 on non-conductive work piece 3. As a chemical reaction in local area adjacent to non-conductive work piece 3, etching is accomplished simultaneously as fusion evaporation 7 is being applied in said small area by locally concentrated high temperature, thus achieving local area processing with smoothly finished surface. As shown in FIG. 1, conventional laser processing generates higher temperature as well as heat accumulation in the processing area and leaves drilled hole with course finish. The present invention, on the other hand, discloses a novel way of arc processing by simultaneous application of etching and lower temperature than that in laser processing, in confined local area so as to attain fine processing without leaving finished product with dross, etc. as does in conventional laser processing.

Figure 3:
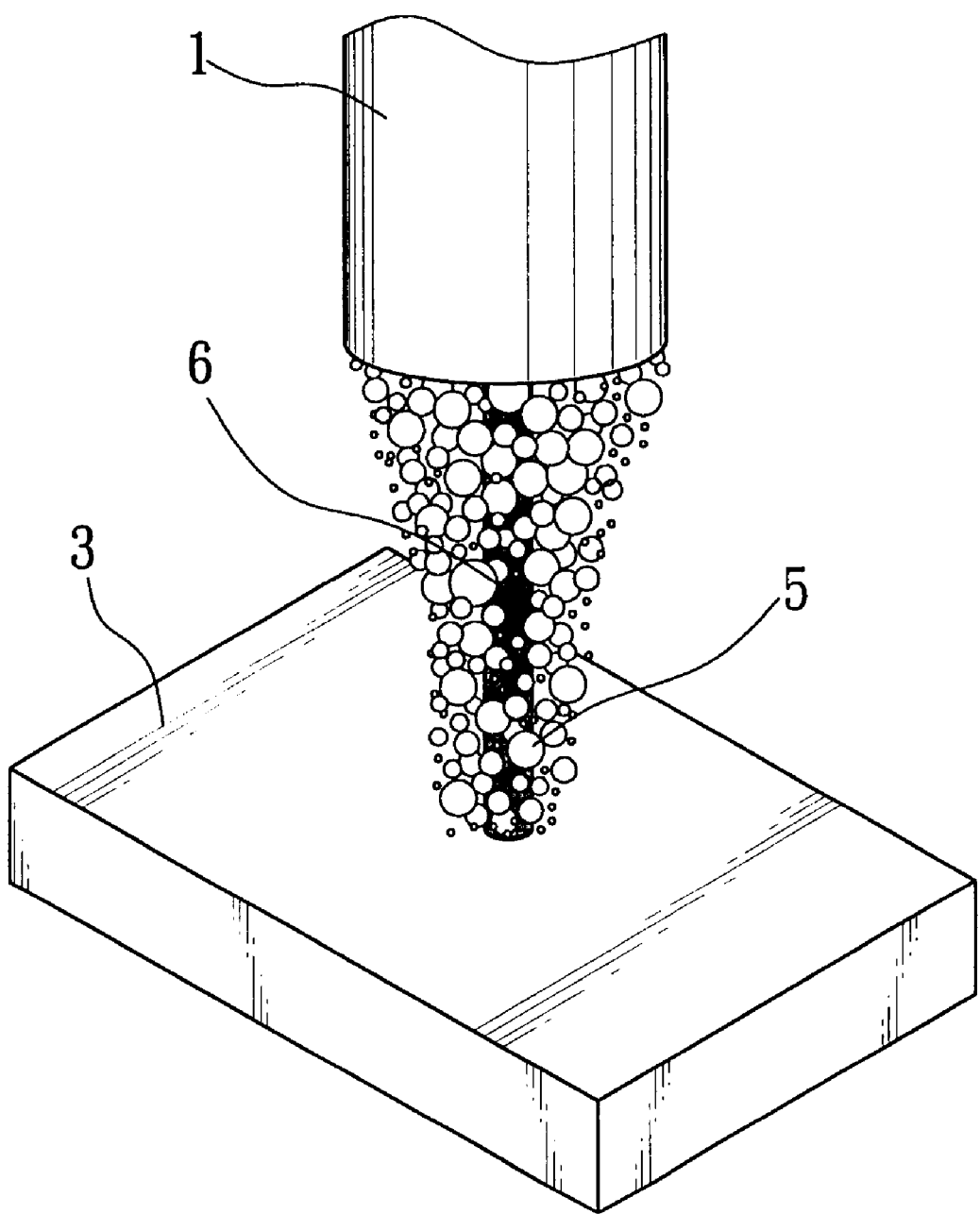
FIG. 3 is a 3-dimensional view of an electro-chemical discharge method and device with self-acting bubble layers.
Figure 4:
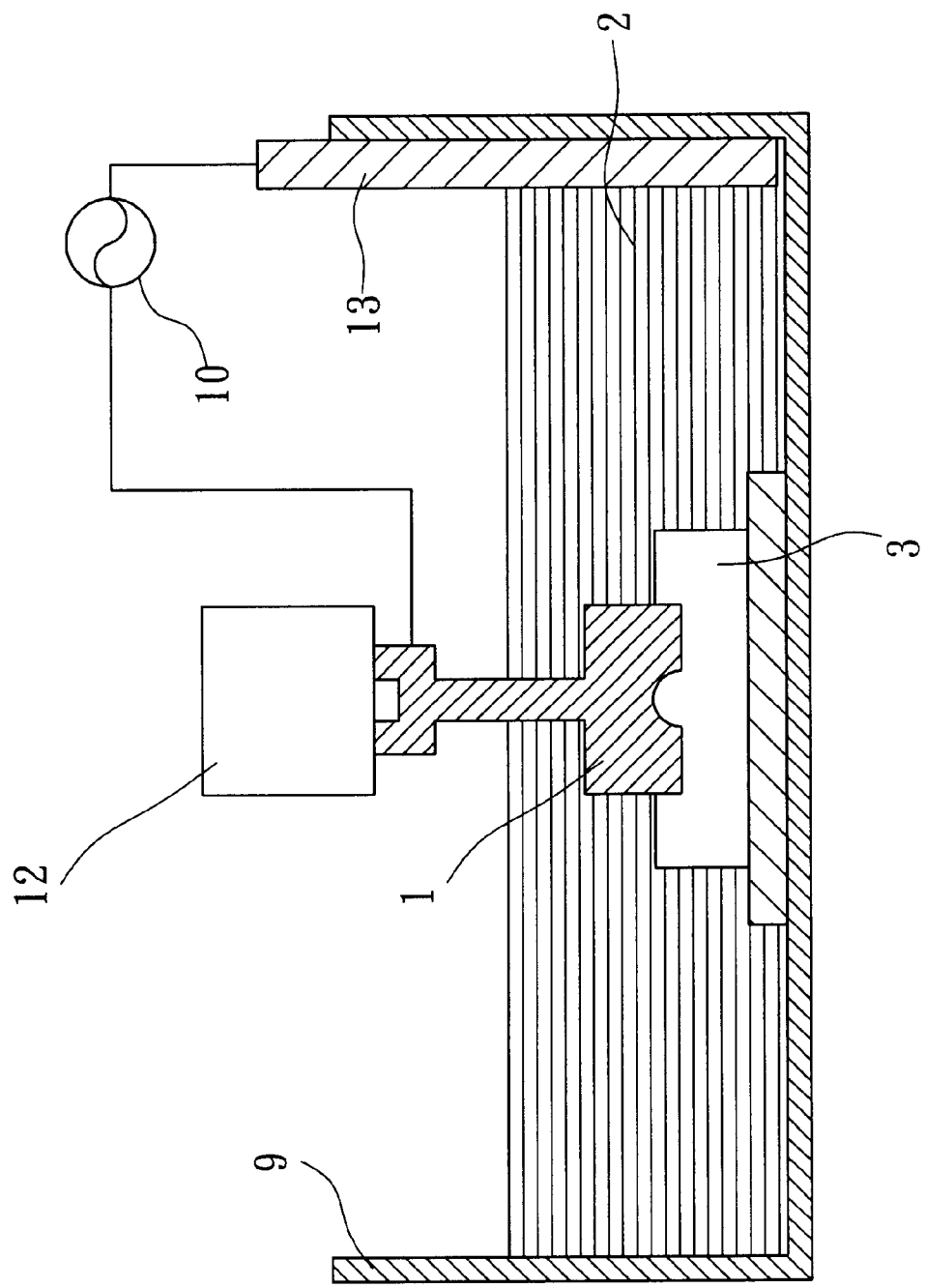
FIG. 4 is a perspective view of an electro-chemical discharge method and device with self-acting bubble layers.

The 3-dimensional view for an electrochemical discharge method and device with self-acting bubble layers as shown in FIG. 3 reveals the relationship among self-acting electrode 1, bubble layers 5, arc 6 and non-conductive work piece 3. Self-acting electrode 1 can be customized and catered to many sorts of arc processing. Various electrodes may be applied to carve processing non-conductive materials to achieve desired shape and form. FIG. 4 shows an example of carve-processing where concave self-acting electrode is used to obtain similarly shaped work piece. By employing pointed or cylindrical self-acting electrode of 200μm in diameter, gemstones such as agate, Burmese jade, ruby, and artificial diamonds, etc. are suitable candidates for fine drill processing shown in FIG. 2.

As shown in FIG. 4, a schematic diagram of an electrochemical discharge device with self-acting bubble layers illustrates the first embodiment of the present invention. The apparatus in accordance with the first embodiment has a self-acting electrode 1, acting as the cathode and an auxiliary conductive electrode 13, being the anode. Fastened by a holder 12, said self-acting electrode I is connected in series with said auxiliary electrode 13 and an external power supply 10. The apparatus further comprises a conducting fluid 2, being restrained in a conducting fluid container 9, wherein said self-acting electrode 1 hangs over the top, drops down and dips in said conducting fluid 2 while said auxiliary electrode 13 also immerses in said conducting fluid 2. Immersed entirely in conducting fluid 2, situated on and facing the coming arc path at a proper distance from the self-acting electrode 1, a non-conductive work piece 3 for processing is in a condition of nearly zero conductivity. Composed of heat-resistant and anti-corrosive materials, said conducting fluid container 9 is used in high temperature and chemically reactive environments.

Figure 5:
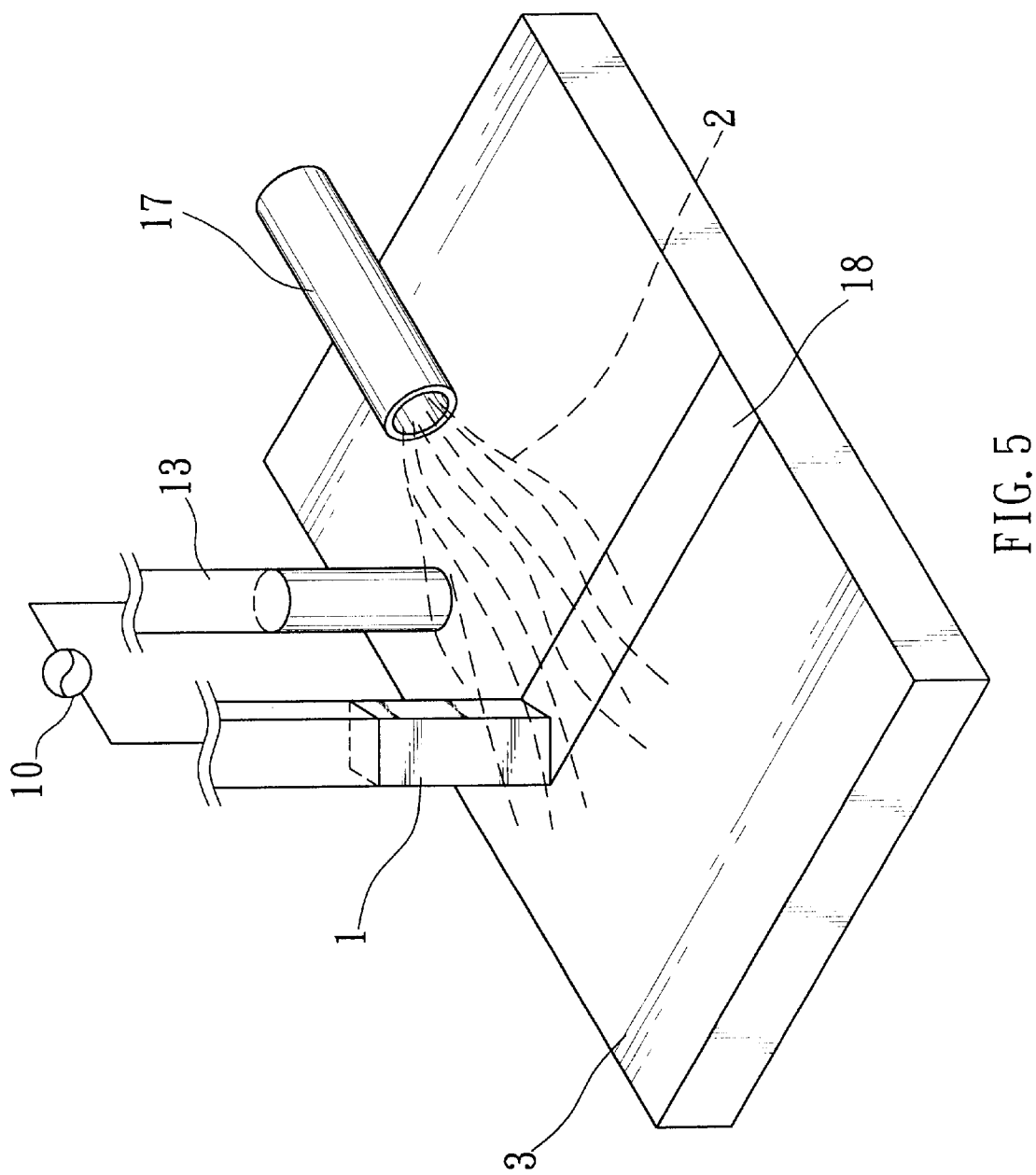
FIG. 5 is a perspective view of an electro-chemical discharge device with self-acting bubble layers in accordance with the second embodiment of the present invention.
Figure 7:
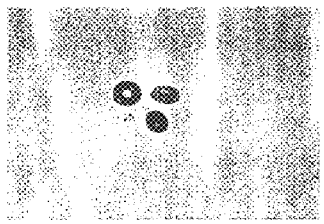
FIG. 7 is a picture of the processed gemstones.
Figure 6:
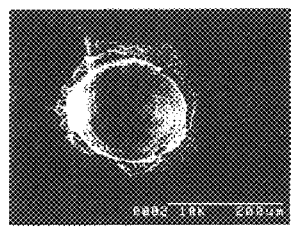
FIG. 6 shows a laser processed work piece and a simultaneous arc and etching processed work piece, side by side.
Figure 6:
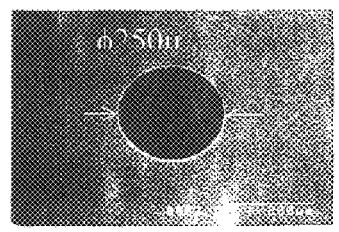

FIG. 5 is a schematic illustration of an electrochemical discharge device with self-acting bubble layers in accordance with the second embodiment of the present invention. Under the circumstance when self-acting electrode 1, auxiliary electrode 13, and non-conductive work piece 3 cannot all fit in the same container, a conducting fluid dispenser 17 can be introduced to supply an adequate amount of conducting fluid and provide the right environment for allowing self-acting electrode 1, auxiliary electrode 13, and non-conductive work piece 3 to function together for processing along process track when connected to an external power supply 10.

As opposed to conventional electrolysis that yields insufficient bubbles, the device shown in FIG. 1 introduces a novel self-acting electrode 1 capable of actively producing sufficient bubbles. By producing sufficient bubbles, forming insulating layer and causing earlier generation of arc discharge, the present invention provides cost savings of processing by lowering the electrical power required to induce arc discharge.

Through simultaneous application of arc processing and chemical etching, the present invention reveals a new way of greatly enhancing processing rate and processing precision. Further, by providing self-acting bubbles, the present invention offers added benefit of saving processing cost by reducing the time required for arc to take place. To recap, the device and method disclosed in the present invention provide novel ways of processing non-conductive material with added advantages of saving power consumption and arc initiation time that are substantially different from the conventional arts in existence. In light of the foregoing, it is believed that the present invention possesses novelty and non-obviousness beyond the scope of conventional arts.

While the invention has been described in terms of several preferred embodiments, various alternatives and modifications can be devised by those skilled in the art without departing from the invention. Accordingly, the present invention is intended to embrace all such alternatives that fall within the scope of the claims.

What is claimed is:

1. A electrochemical discharge device with self-acting bubble layers, comprising:
   a self-acting electrode being a negative electrode;
   an auxiliary electrode being a positive electrode;
   a power supply being connected in series with said self-acting electrode and said auxiliary electrode;
   a non-conductive work piece for processing, situated in a position on an arc path facing and at a distance from the self-acting electrode, wherein, under normal room temperature and atmosphere, said work piece is nearly non-conductive;
   a conducting fluid providing a common environment for said self-acting electrode, said auxiliary electrode and said non-conductive work piece; and,
   a self-acting bubble electrochemical discharge processing device, wherein the self-acting bubble processing electrode includes a plurality of micro-pipes under an exhaust opening and a hollow container.

2. The device of claim 1 wherein the exhaust opening is connected to an air dispenser for accessing an external air source.

3. An electrochemical discharge method with self-acting bubble layers, comprising the steps of:
   (a) place a self-acting electrode and a non-conductive work piece in a conducting fluid wherein said non-conductive work piece is situated on the arc path facing and at a proper distance from said self-acting electrode;
   (b) connect air dispenser with exhaust opening on one end and air source on the other and deliver air from said air source through micro-pipes located on the bottom of self-acting electrode to the conducting fluid;
   (c) place an auxiliary electrode, along with said self-acting electrode and said non-conductive work piece, in said conducting fluid wherein an external power supply is connected in series with said self-acting electrode and said auxiliary electrode;
   (d) forming self-acting bubble layers in the region around the micro-pipe openings, located on the lower part of the self-acting bubble layers processing electrode.
   (e) generate electrolysis reaction in said insulating fluid;
   (f) generate non-conductive region in said conducting fluid;
   (g) generate arc discharge in said conducting fluid;
   (h) effect fusion evaporation and etching on said non-conductive work piece.

4. The method of claim 3, wherein self-acting bubble layers of step
   (d) are generated by delivering air from air source, through air dispenser, air chamber of said self-active electrode and micro-pipes, to the conducting fluid.

5. The method of claim 3, wherein the electrolysis reaction of step (e) further comprises a cathode half-reaction and an anode half-reaction.

cathode half-reaction: $2H_2O+2e^- \rightarrow 2(OH)^- + H_2$ anode half reaction: $4(OH)^- \rightarrow 2H_2O + O_2 + 4e^-$ 6. The method of claim 5, wherein non-conductive regions in said conducting fluid of step (f) are formed by accumulating bubbles generated by self-acting bubble layers and bubbles created as a result of electrolysis in the region between the bottom of self-acting electrode and the non-conductive work piece.

7. The method of claim 3, wherein arc discharge of step (g) is generated as a result of capacitive collapse in the bubble layers and ionic breakdown in air molecules caused by application of high voltage across said self-acting electrode and said auxiliary electrode.

8. The method of claim 3, wherein fusion evaporation of step (h) is caused by high temperature concentration in designated local areas being brought about by heat generation associated with arc discharge.

9. The method of claim 3, wherein etching on said non-conductive work piece of step (h) is brought about by chemical reaction between said conducting fluid and said non-conductive work piece.

* * * * *